(12) United States Patent
Reilly

(10) Patent No.: US 6,580,422 B1
(45) Date of Patent: Jun. 17, 2003

(54) REMOTE COMPUTER DISPLAY USING GRAPHICS PRIMITIVES SENT OVER A WIRELESS LINK

(75) Inventor: John R. Reilly, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 08/430,943

(22) Filed: Apr. 27, 1995

(51) Int. Cl.[7] .................................................. G09G 5/00
(52) U.S. Cl. ........................ 345/169; 345/2.2; 345/2.3; 345/169
(58) Field of Search ............................ 345/1, 2, 3, 202, 345/901, 2.1, 2.2, 2.3, 169; 364/514 A; 340/176, 825.69, 825.72, 825.44; 395/200.03, 200.04, 200.09, 200.18, 154, 151, 155, 161

(56) References Cited

U.S. PATENT DOCUMENTS

| | | | | |
|---|---|---|---|---|
| 5,337,044 A | * | 8/1994 | Folger | 340/825.44 |
| 5,408,250 A | * | 4/1995 | Bier | 345/169 |
| 5,440,559 A | * | 8/1995 | Gaskill | 340/825.44 |
| 5,523,769 A | * | 6/1996 | Lauer et al. | 345/2 |
| 5,528,296 A | * | 6/1996 | Gove et al. | 395/151 |
| 5,553,223 A | * | 9/1996 | Greenlee et al. | 395/200.09 |

FOREIGN PATENT DOCUMENTS

| | | | | |
|---|---|---|---|---|
| EP | 0616448 | * | 9/1994 | 395/200.04 |

* cited by examiner

*Primary Examiner*—Bipin Shalwala
*Assistant Examiner*—David L Lewis

(57) ABSTRACT

A remote computer display for a portable computing device (PCD) utilizing the transfer of graphics primitives over a wireless data link. The present invention utilizes a wireless (RF or optical) transmitter built into a portable computing device to send graphics commands to a remote computer display. A receiver receives the wireless signals and converts the signals into data which produces a graphics image of the remote computer display. To reduce the data link bandwidth needed to transfer images from the PCD to the remote display, graphics primitives such as HPGL are sent over the data link. The PCD includes a video driver to convert video display requests made by the PCD operating system, or an application program executing on the PCD, into the graphics primitives which are then transferred to the remote display over the data link.

21 Claims, 5 Drawing Sheets

REMOTE COMPUTER DISPLAY USING GRAPHICS PRIMITIVES SENT OVER A WIRELESS LINK

FIELD OF THE INVENTION

The present invention relates to remote computer displays. In particular, this invention relates to a remote computer display which takes graphics primitives sent over a wireless link and converts the primitives into a graphics display.

BACKGROUND OF THE INVENTION

The size of the built in video display for a portable computing device (PCD) is generally limited to the dimensions of the devices' enclosure. Portable computing users accept smaller video displays in order to be mobile. Once back in the office or home environment however, small video display dimensions are a product liability.

Because PCD's are reaching sufficient capabilities in computing speed, mass storage, and keyboard ergonomics, users are beginning to consider using a single computing device, their PCD. One important consideration in the decision to switch from using a non-PCD in the workplace, and a PCD for travel and home use are the dimensions of the video display.

Two techniques are generally used to connect a video display with larger dimensions to a PCD: a direct cabled connection to a video display device, or a "docking station" with its own video display device. A direct cabled connection requires that the PCD contain the interface hardware required to properly drive the video display. A docking station requires that the PCD contain the interface hardware required to properly connect to the docking station. This also implies that the number of different kinds of docking stations that may realistically be supported is limited to the amount of hardware support supplied in the PCD.

An alternative to a direct cabled connection or docking station is to allow the PCD to communicate over a wireless (this includes both radio frequency and optical such as infra-red light) data link to a remote display controller that supports a number of different video display devices. The advantage is that standard data link hardware and software protocols would already be built into the PCD to enable it to communicate with other data link compatible devices'. This eliminates the need for the video display driver hardware or docking station hardware to be built into the PCD.

To accomplish the task of drawing the images on the remote video display it is necessary to transfer the image, that the software in PCD is building, across the data link to the remote display controller. However, the data rate required to drive the video display device is quite high. For example to display a frame of video on a monitor having 1280 by 1024 pixels and 256 pixel colors, the PCD needs to transfer 335,544,320 bits of information to the remote display per frame displayed. The costs for such a high data rate link may be prohibitive given the price sensitivity of consumers.

Therefore what is needed in the industry is a means to reduce the bandwidth required to transfer display information to a remote computer display by a wireless data link.

SUMMARY OF THE INVENTION

The present invention provides a wireless remote computer display that minimizes the required data link bandwidth by sending graphics primitives over the data link. The number of primitive drawing instructions required to generate a video image are significantly less than required to directly transferring the video image as a bit stream. A wireless data link would transport the primitive drawing instructions from the PCD to the remote display controller. Hardware in the remote display controller interprets the primitive drawing instructions and generates the video image on the remote computer display.

In a PCD, applications make requests to the operating system to manipulate the video display. The operating system passes the requests to an appropriate software video driver. The video driver interprets the requests and generates changes to the appropriate pixels on the video display. In the present invention, the software video driver in the PCD is used to send the primitive drawing instructions to a protocol module responsible for communicating across the wireless data link to the remote display controller. The remote video controller contains a software and/or hardware driver that interprets the primitive drawing instructions and generates the image on the video display.

The advantages of the present invention are: a PC can be serviced by any remote display controller using a standard wireless data link protocol, the PCD vendor gets a larger video display capability by adding a software driver, the user has one less cable to plug in, and the hardware in the remote display controller may be optimized to perform the image generation faster than is possible by the PCD.

DETAILED DESCRIPTION OF THE INVENTION

The present invention keeps data link bandwidth to a minimum by sending graphics primitives across the data link instead of directly transferring an image as a bit stream. Graphics primitives are high level instructions which tell a graphics display what to draw. Typically a primitive has a format such as "instruction (argument)". The "instruction" is a drawing command such as a command to draw a line. The "argument" is information used by the instruction such as the starting point, end point and color of the line. So a line draw primitive may look like "Line(x1y1, x2y2, color). In this example, the graphics display is instructed to draw a line from point (x1y1) to point (x2y2) having a particular color. Other primitives are used in the industry. For example, the Hewlett-Packard Co. Graphics Language (HPGL) is a well known high level graphics language consisting of graphics primitives.

Figure 1:
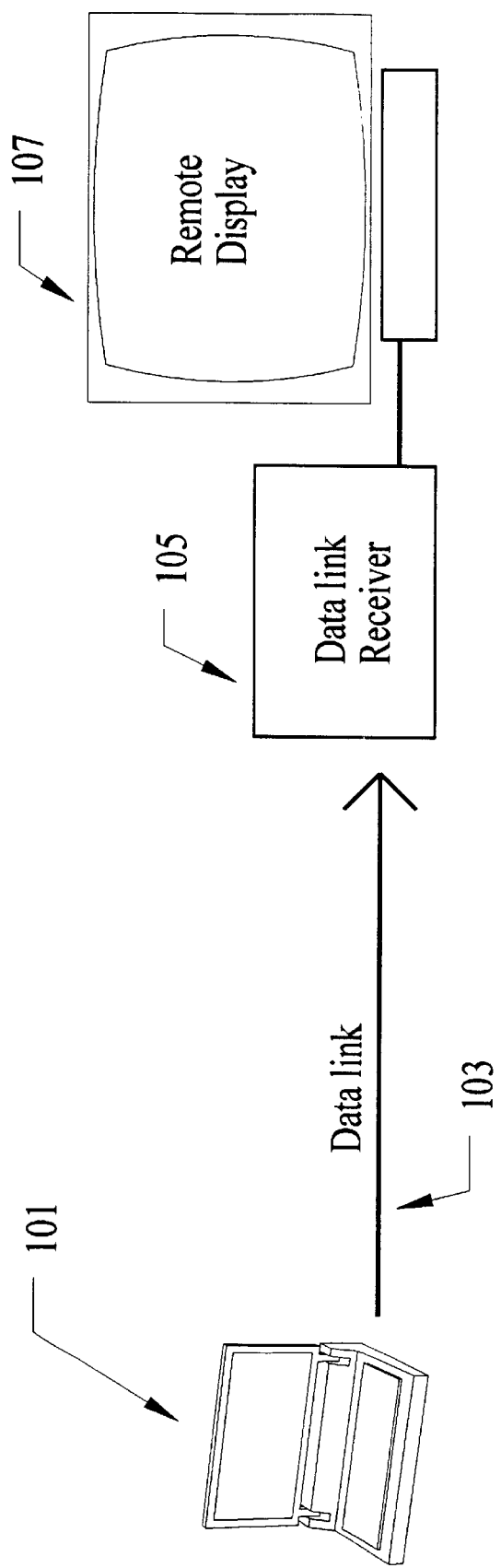
FIG. 1 illustrates a simplified view of the present invention.

FIG. 1 illustrates a remote display system according to the present invention. A laptop computer PCD 101 transmits graphics primitives over a wireless data link 103 to a data link receiver 105. The data link receiver 105 is connected to a large remote computer display 107.

The PCD transmits primitives over a wireless link using either radio frequency (RF) or optical technologies both well known in the art. This link is in turn received by the data link receiver 105 which converts the RF or optical signals into digital data. The digital data is interpreted by the remote display 107 as graphics primitives which are then used to generate an image on the remote display. The data link receiver 105 may be integral with the housing of the remote display 107 or a constructed as a separate device.

Figure 2:
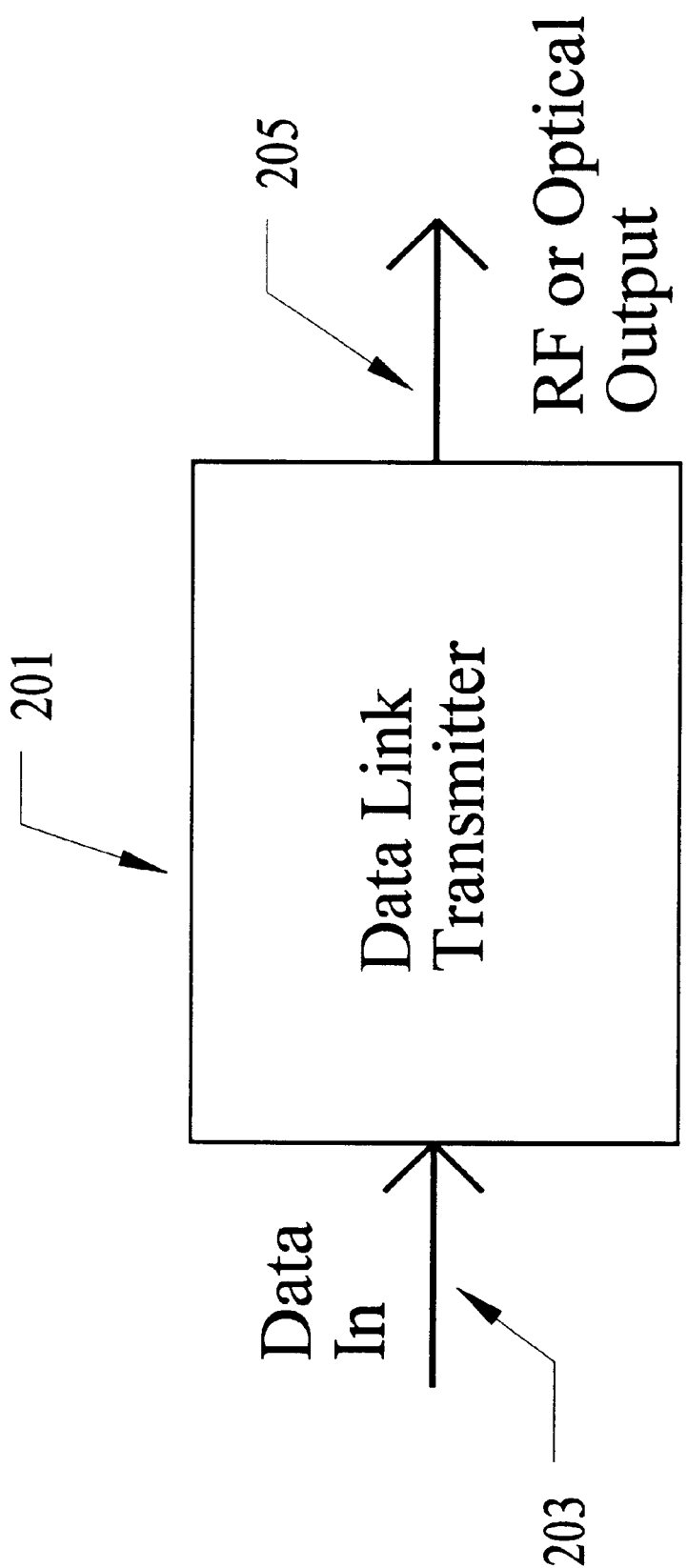
FIG. 2 illustrates a block diagram of the data link transmitter.

FIG. 2 illustrates an overview of the data link transmitter 201 which is contained within the PCD 101 housing, or as a semi-permanent attachment added on to the PCD housing. The data link transmitter has a data input 203 and a wireless output 205. The transmitter converts digital data from the PCD into either RF or optical signals which is sent to the remote display. In practice, the transmitter 201 would be interfaced to the PCD as a communications "port" much the same way as is commonly done for serial and parallel interfaces as is well known in the industry.

The PCD interfaces to the transmitter using a software or hardware driver which is linked into the operating system or other program running in the PCD. When a program running in the PCD wishes to send data to the remote display, the program issues a subroutine "call" to the appropriate driver for the data link transmitter. This subroutine formats and sends the required information to the data link transmitter for sending over the data link to the remote display.

Figure 3:
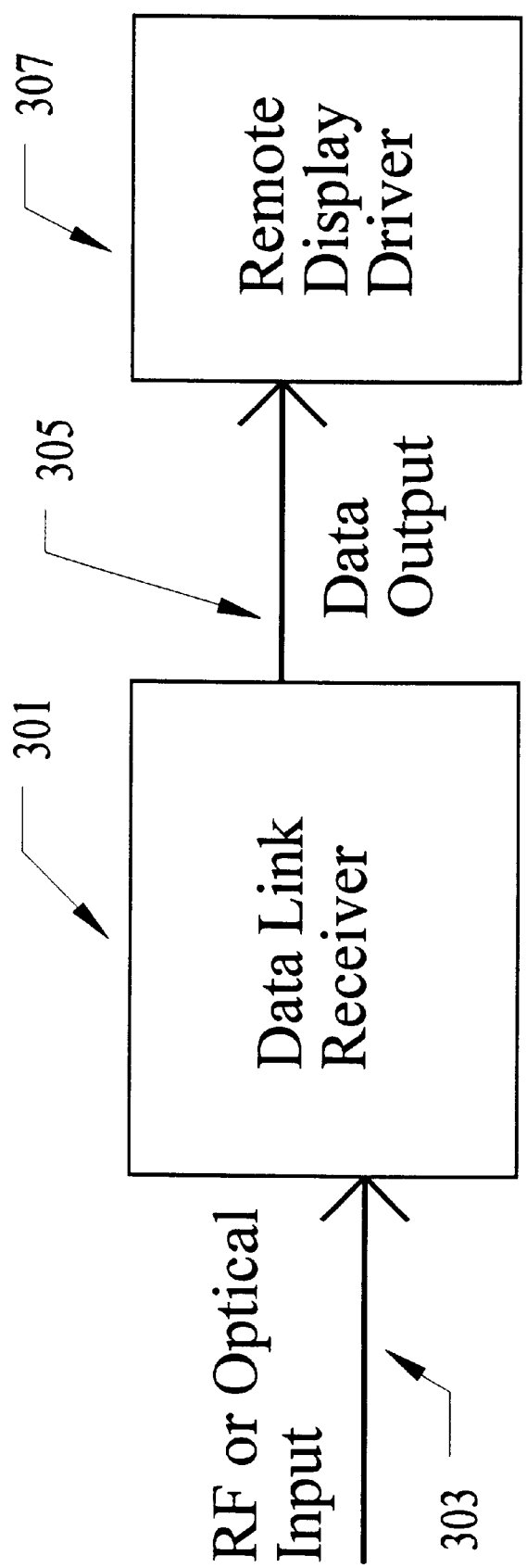
FIG. 3 illustrates a block diagram of the data link receiver system.

FIG. 3 illustrates an overview of the data link receiving system. A data link receiver 301 receives RF or optical signals 303 sent by the data link transmitter 201. The receiver 301 receives the data link signals 303 and converts them into digital data 305 which is sent to a remote display driver 307. Hardware and software in the remote display driver 307 interprets the data output 305 to produce a graphics image on the remote display.

Figure 4:
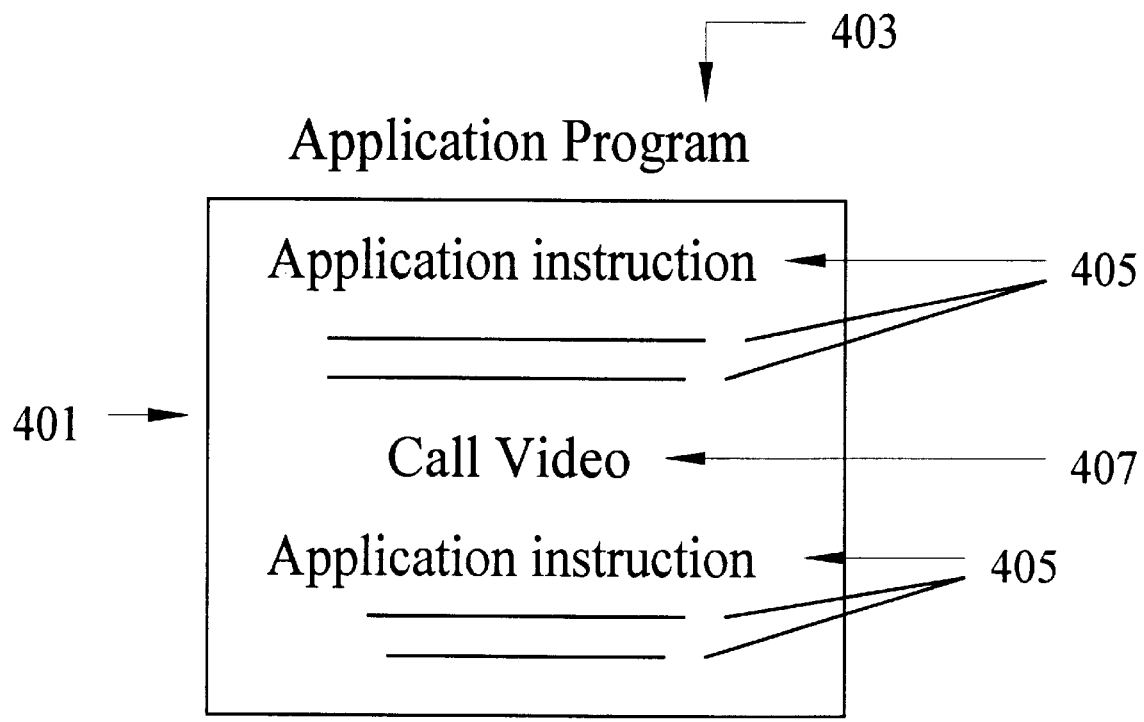
FIG. 4 illustrates a portion of the code of an application program.

FIG. 4 illustrates a portion 401 of a software application program 403 which runs on a PCD. The application includes a series of instructions 405. Within the program code is a "call video" 407 subroutine call. This call can either be a operating system subroutine call or a call to a special video driver. The video routine is responsible for formatting and sending the required data (graphics primitives) to the data link transmitter for transfer over the data link to the remote display. When the subroutine completes the data link transfer, it "returns" to the calling program 403 which continues to execute on the PCD. This video driver is designed to appear like any other PCD video driver. That is, the driver uses a standard applications program interface.

Figure 5:
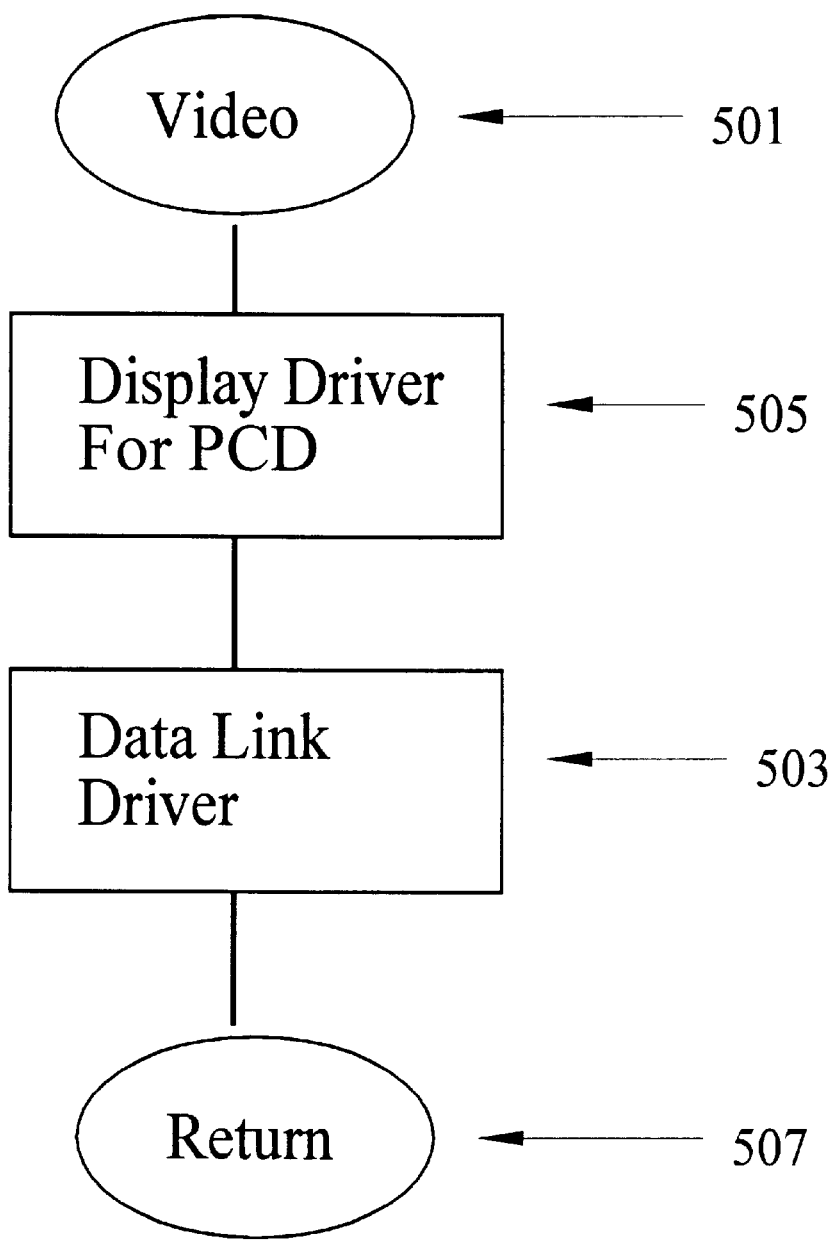
FIG. 5 illustrates a simplified flow chart of a video driver subroutine.

FIG. 5 illustrates a block diagram of a video driver subroutine 501 for a PCD. The video driver at minimum, includes a data link driver 503. The data link driver 503 is responsible for determining what display command the application program 403 is issuing and sending the appropriate graphics primitive to the data link transmitter. A PCD display driver 505 would also be typically included in the video driver to send the appropriate data to the display internal to the PCD. The internal display can simultaneously display the same image as the remote display with either the same or reduced resolution. Alternatively, the internal display can be disabled when the remote display is being used. Once the video driver subroutine has completed the video driver tasks, it returns 507 to the calling program (403 in this example).

As previously mentioned, this video driver subroutine can be part of the PCD software operating system or a separate terminate and stay resident (TSR) software routine. In either case, the video driver routine is available to the PCD operating system and to application programs executing on the PCD.

While a preferred embodiment of the invention has been described, other embodiments of the invention will be apparent to those skilled in the art from a consideration of this specification or practice of the invention disclosed herein. For example, instead or combined with sending graphics primitives to a remote display, a remote graphics plotter may utilized. The plotter would have a data link receiver which receives the graphics primitives and sends them to the plotter to produce a hard copy graphics image. Therefore it is intended that the specification and examples be considered as exemplary only, with the scope of the invention being defined by the following claims.

I claim:

1. A remote computer display system comprising:

a portable computing device (PCD) having a wireless transmitter;

a remote video display electrically connected to a wireless receiver;

the PCD also having a video driver operative to receive video requests issued by a software program executing on the PCD and converting the video requests into graphics primitives which are sent as signals by the wireless transmitter to the wireless receiver;

the wireless receiver being operative to receive the signals sent by the wireless transmitter and to convert the received signals into digital data representing the graphics primitives and also operative to send the digital data to a remote display driver; and the remote display driver is operative to cause the remote video display to display a video image in response to the digital data sent by the wireless receiver.

2. A remote computer display system as in claim 1 wherein:

the wireless transmitter sends graphics primitives to the wireless receiver using infra-red light.

3. A remote computer display system as in claim 1 wherein:

the wireless transmitter sends graphics primitives to the wireless receiver using radio frequencies (RF).

4. A remote computer display system as in claim 1 wherein:

the graphics primitives are Hewlett-Packard Co. Graphics Language (HPGL) graphics primitives.

5. A remote computer display system as in claim 1 wherein:

the wireless receiver is encased in a housing separate from the remote video display.

6. A remote computer display system as in claim 1 wherein:

the wireless receiver is encased integrally with the remote video display.

7. A remote computer display system as in claim 2 wherein:

the wireless transmitter is integral with the PCD.

8. A remote computer display system as in claim 3 wherein:

the wireless transmitter is integral with the PCD.

9. A remote computer display system comprising:

a portable computing device (PCD) having a wireless transmitter;

a remote video display electrically connected to a wireless receiver;

the PCD also having a video driver operative to receive video requests issued by a software program executing on the PCD and converting the video requests into graphics primitives which are sent as signals by the wireless transmitter to the wireless receiver;

the wireless receiver being operative to receive the signals sent by the wireless transmitter and to convert the received signals into digital data representing the graphics primitives and also operative to send the digital data to a remote display driver;

the remote display driver is operative cause the remote video display to display a video image in response to the digital data sent by the wireless receiver; and the video driver is also operative to receive video requests issued by the software program executing on the PCD and send data to a video display internal to the PCD to cause the internal video display to substantially simultaneously display substantially the same video image as the remote display.

10. A remote computer display system as in claim 9 wherein:

the wireless transmitter sends graphics primitives to the wireless receiver using infra-red light.

11. A remote computer display system as in claim 9 wherein:

the wireless transmitter sends graphics primitives to the wireless receiver using radio frequencies (RF).

12. A remote computer display system as in claim 9 wherein:

the graphics primitives are Hewlett-Packard Co. Graphics Language (HPGL) graphics primitives.

13. A remote computer display system as in claim 9 wherein:

the wireless receiver is encased in a housing separate from the remote video display.

14. A remote computer display system as in claim 9 wherein:

the wireless receiver is encased integrally with the remote video display.

15. A remote computer display system as in claim 10 wherein:

the wireless transmitter is integral with the PCD.

16. A remote computer display system as in claim 11 wherein:

the wireless transmitter is integral with the PCD.

17. A remote computer display system comprising:

a video display; and, a wireless receiver, electrically connected to the video display, the wireless receiver being operative to receive signals sent by a wireless transmitter, the signals sent by the wireless transmitter being video requests having been converted into graphics primitives by a remote computing system, wherein the wireless receiver includes:

converter means for converting the received signals into digital data representing the graphics primitives, and, a remote display driver which receives the digital data and causes the remote video display to display a video image in response to the digital data sent by the wireless receiver.

18. A remote computer display system as in claim 17 wherein:

the wireless receiver is encased in a housing separate from the remote video display.

19. A remote computer display system as in claim 17 wherein:

the wireless receiver is encased integrally with the remote video display.

20. A computing device comprising:

a wireless transmitter;

a software program means for issuing video requests; and, a video driver for converting the video requests into graphics primitives and for sending the graphics primitives to the wireless transmitter;

wherein the wireless transmitter includes means for converting the graphics primitives into digital data representing the graphics primitives and for sending the digital data to a wireless receiver connected to a remote display.

21. A computing device as in claim 20 wherein the video driver is additionally operative to receive video requests issued by the software program means and send data to a video display internal to the computing device to cause the internal video display to substantially simultaneously display substantially a same video image as the remote display.

* * * * *